United States Patent [19]
Ito

[11] Patent Number: 5,475,736
[45] Date of Patent: Dec. 12, 1995

[54] RADIO COMMUNICATION SYSTEM WHICH DISPLAYS STATUS OF WIRED LINES

[75] Inventor: Koichi Ito, Hino, Japan

[73] Assignee: Kabushiki Kaisha Toshiba, Kawasaki, Japan

[21] Appl. No.: 261,204

[22] Filed: Jun. 15, 1994

Related U.S. Application Data

[63] Continuation of Ser. No. 678,868, Apr. 3, 1991, abandoned.

[30] Foreign Application Priority Data

Apr. 5, 1990 [JP] Japan ........................................ 2-90532

[51] Int. Cl.⁶ .................................................. H04M 11/00
[52] U.S. Cl. .................. 379/63; 379/58; 379/61
[58] Field of Search .................................. 379/58, 61, 62, 379/63

[56] References Cited

U.S. PATENT DOCUMENTS

| 4,538,028 | 8/1985 | Gazzoli et al. | 379/164 |
| 4,768,218 | 8/1988 | Yorita | 379/63 |
| 4,776,001 | 10/1988 | Murata et al. | 379/62 |
| 4,933,963 | 6/1990 | Sato et al. | 379/61 |
| 4,939,785 | 7/1990 | Murata et al. | 379/63 X |

FOREIGN PATENT DOCUMENTS

| 0214809A2 | 3/1987 | European Pat. Off. . |
| 0243900A2 | 11/1987 | European Pat. Off. . |
| 0347167AA2 | 12/1989 | European Pat. Off. . |
| 61-063121 | 8/1986 | Japan . |
| 62-277825 | 5/1988 | Japan . |
| 3117934 | 8/1991 | Japan . |

Primary Examiner—Curtis Kuntz
Assistant Examiner—G. J. Oehling
Attorney, Agent, or Firm—Finnegan, Henderson, Farabow, Garrett & Dunner

[57] ABSTRACT

A radio communication apparatus includes a base unit connected to wired lines and a plurality of radio telephone sets connected to the base unit via a radio link, and can inform an operator using each individual radio telephone set of service states of the wired lines without a special operation. Wired-line information indicative of the service states of the wired lines is transmitted with such wired-line information contained in a control signal which is transmitted from the base unit to the radio telephone sets when the base unit is to establish a radio link with the radio telephone sets or at the time of the termination of establishing the radio link. The radio telephone sets receives information indicative of the service states of the wired lines from the base unit, and displays the service states of the wired lines on a display device on the basis of such information.

9 Claims, 12 Drawing Sheets

RADIO COMMUNICATION SYSTEM WHICH DISPLAYS STATUS OF WIRED LINES

This application is a continuation of application Ser. No. 07/678,868 filed Apr. 3, 1991, now abandoned.

BACKGROUND OF THE INVENTION

1. Field of the Invention

The present invention relates to a radio communication apparatus comprising a base unit connected to wired lines and a plurality of radio telephone sets connected to the base unit through a radio link and, more particularly, to a radio communication apparatus which can inform an operator using each individual radio telephone set of service states of the wired lines without a special operation.

2. Description of the Related Art

A conventional apparatus of this kind is arranged as shown in FIG. 11. A base unit 1 is connected to a radio telephone set 2 via a radio link and also to a wired telephone line 3.

The operation of the shown apparatus will be described in outline below.

A signal transmitted over the wired telephone line 3 is applied to a transmitter 5 as a modulating input through a line relay 33 and a hybrid circuit 4. A modulated signal which is produced by the transmitter 5 is transmitted from a transmitting antenna 6 to the radio telephone set 2 in the form of a radio wave.

A radio wave transmitted from the radio telephone set 2 is received by a receiving antenna 7 and demodulated by a receiver 8. The resultant demodulated signal is transmitted to the wired telephone line 3 via the hybrid circuit 4.

A synthesizer 9 outputs a frequency corresponding to a radio channel to the transmitter 5 and the receiver 8.

One output of the receiver 8 is inputted to a received-electric-field detecting circuit 10 for determining its electric field strength. A carrier squelch circuit or a noise squelch circuit may be utilized as the received-electric-field detecting circuit 10.

Another output of the receiver 8 is a data signal which is contained in a demodulated received wave, and is inputted to an identification signal detecting circuit 11 for collating an input signal with an identification signal (ID code) determined by a combination of the base unit 1 and the radio telephone set 2. In the identification signal detecting circuit 11, the other output of the receiver 8 is collated with such an identification signal.

The outputs of the received-electric-field detecting circuit 10 and the identification signal detecting circuit 11 as well as the demodulated output of the data signal from the receiver 8 are inputted to a control circuit 12, where such outputs are used for connection control. The control circuit 12 provides various kinds of controls; for example, it executes radio channel control by controlling the synthesizer 9 or supplies to the transmitter 5 a data signal as a modulating input. An incoming-signal detecting circuit 30 detects a ringing signal of 16 Hz which is received from the wired line at the time of the reception of an incoming call.

The radio telephone set 2 is similarly provided with a receiving antenna 13 and a receiver 14, and a demodulated output is supplied to an earpiece 15. A voice which has been inputted through a mouthpiece 16 is supplied to a transmitter 17 as a modulating input, and a radio wave is transmitted from a transmitting antenna 18.

A synthesizer 19, a received-electric-field detecting circuit 20 and an identification signal detecting signal 21 are substantially identical to those used in the base unit 1, and a control circuit 22 provides control over the radio telephone set 2. A loud speaker 23 serves as a sounder for generating a ringing tone at the time of the reception of an incoming call.

Referring to an electric power circuit, an ac plug 24 of the base unit 1 is connected to a 100 V ac power line, and the output of a rectifying-stabilizing circuit 25 is utilized by individual circuits. The output of the rectifying-stabilizing circuit 25 is also supplied to a rechargeable battery 29 for the radio telephone set 2 via a current controlling resistor 26 and charging terminals 27 and 28. The output of the rechargeable battery 29 is used for the electric power of the radio telephone set 2.

When an incoming signal is received, the above-described conventional example performs control as schematically shown in FIG. 12.

When the incoming-signal detecting circuit 30 detects a ringing signal of 16 Hz transmitted over the wired telephone line 3 during a ready state (Step 34), the base unit 1 sets the frequency of the synthesizer 9 to a control channel and turns on the transmitter 5 to transmit an incoming signal (Step 35). The incoming signal contains a signal for specifying a speech channel (S-CH).

In the meantime, for a predetermined time t1 during the ready state, the radio telephone set 2 holds the synthesizer 19 "on" to set the frequency thereof to a control channel, and holds the receiver 14 "on" (Step 36). If the incoming signal is received during this time (Step 37), the transmitter 17 is turned on (Step 38) to transmit an incoming call response signal (Step 39) and the specified speech channel (S-CH) is selected (Step 45). If the incoming signal is not received during this time, the synthesizer 19 and the receiver 14 are held "off" for a predetermined time t2 (Step 40). The operation of intermittently performing reception while turning on and off the receiver 14 is called "battery saving".

More specifically, if I OFF represents a current consumption occurring when the receiver 14 is off and I ON represents a current consumption occurring when it is on, an average current consumption I A occurring during the ready state is:

$$IA = \frac{1}{t1+t2} (t1 \times I\,\text{ON} + t2 \times I\,\text{OFF})$$

Since I ON>>I OFF is normally obtained, I A can be made small.

When the received-electric-field detecting circuit 10 detects a radio wave transmitted from the radio telephone set 2 (Step 41), the base unit 1 stops transmitting the incoming signal (Step 42). If no radio wave is detected at this time, the base unit 1 continues to transmit the incoming signal by a predetermined number of times n (Step 43). The reason why the incoming signal is transmitted by the predetermined number of times n is that the radio telephone set 2 is intermittently performing reception so that it can receive no signal during the time t2. It is sufficient that transmission is continued for a time period which is longer than the time t2 by two signals. The reason why the transmission is performed by n times only is to prevent a control channel from being unnecessarily occupied if, for example, the electric power of the radio telephone set 2 is off or the radio telephone set 2 is excessively remote from the base unit 1.

Then, if the identification signal detecting circuit 11 detects an ID-code coincidence (Step 44), the speech channel S-CH specified by the incoming signal is selected (Step 46). If no ID-code coincidence is found in Step 44, this indicates that a radio telephone set not belonging to this base unit 1 has responded. Accordingly, the base unit 1 waits for the call to disappear from the wired telephone line 3 (Step 57) and returns to the ready state.

After the speech channel S-CH has been selected, the base unit 1 transmits a bell ringing signal (Step 47). When the radio telephone set 2 receives the bell ringing signal (Step 48), the sounder 23 generates a ringing tone (Step 49). If the radio telephone set 2 is set to its off-hook condition in response to the ringing tone (Step 50), an off-hook signal is transmitted (Step 51) and a communication state is established (Step 55).

In the meantime, if the base unit 1 receives the off-hook signal (Step 52), it stops transmitting the bell ringing signal (Step 53) and closes the line relay 33 to form a communication loop with the wired telephone line 3, thereby establishing a communication state (Step 54).

If the number of times of transmission of the incoming signal reaches n, the process proceeds to Step 56, where it is detected whether the reception of the incoming signal has terminated. If the termination of the reception is detected, the base unit 1 returns to the ready state so that it is prevented from again performing an unnecessary receiving operation.

Control which is executed during the originating operation of the radio telephone set 2 is as shown in FIG. 13 in schematic block form. When an originating switch 31 is turned on, origination is initiated (Step 34). The synthesizer 19 is locked on a control channel (C-CH) and the receiver 14 is turned on (Step 35). The received-electric-field detecting circuit 20 checks whether the control channel (C-CH) is idle (Step 36). If the control channel (C-CH) is idle, the transmitter 17 is turned on and an originating signal (containing an ID code) is transmitted (Step 37).

The base unit 1 receives the originating signal (Step 38), and if an ID-code coincidence is found (Step 39), the transmitter 5 is turned on to transmit a response signal (Step 40). The response signal contains the ID code and the number of the speech channel (S-CH) which has been memorized by the base unit 1 through idle-channel search during the ready state.

The radio telephone set 2 receives a radio wave of the control channel (C-CH) (Step 41), and if an ID-code coincidence is found (Step 42), the speech channel (S-CH) specified by the response signal is selected (Step 43), thereby establishing a communication state.

After the response signal has been transmitted, the base unit 1 also selects the specified speech channel (S-CH) (Step 44) to establish a communication state.

If the radio telephone set 2 does not receive the radio wave of the control channel (C-CH), (for example, if the radio telephone set 2 is excessively remote from the base unit 1), the radio telephone set 2 waits for a predetermined time (Step 45) and generates an alarm sound indicating that connection is impossible (Step 46). Then, the radio telephone set 2 returns to the ready state.

If the above-described radio telephone apparatus is to be applied to a system having a plurality of wired lines, such as a business telephone system, it is necessary Go indicate which wired line is idle.

To meet such necessity, an apparatus which can inform an operator using each individual radio telephone set of the service states of wired lines is disclosed in U.S. patent application Ser. No. 08/150,256 and U.S. Pat. No. 5,218,628 filed by the same applicant.

However, the apparatus disclosed in U.S. patent application Ser. No. 08/150,256 relates to a radio telephone apparatus for a so-called public telephone, and allows a radio telephone set (mobile unit) to display the service states of wired lines only when a request for origination from the mobile unit is not accepted. Accordingly, the disclosed apparatus differs from a business-telephone type radio communication apparatus to which the present invention is directed.

The apparatus disclosed in U.S. Pat. No. 5,218,628 has an arrangement in which a base unit transmits information indicative of the service states of wired lines in response to a request from a mobile unit and the mobile unit displays the service states of the wired lines on the basis of the information. With such an arrangement, it is necessary for the operator using the mobile unit to perform a special operation in order to be informed of the service states of the wired lines. As a result, the arrangement forces the operator to perform an extremely complicated operation. It is, therefore, disadvantageous to apply such an apparatus to the business-telephone type radio communication apparatus to which the present invention is directed.

In other words, in the case of the business-telephone type radio communication apparatus to which the present invention is directed, it is preferable that the operator can always be informed of the service states of the wired lines without performing a special operation when using each individual radio telephone set.

However, as described above, to reduce a current consumption and to effectively utilize radio waves, when the radio telephone sets are in their ready states, the transmission of each set is shut off and no radio link is established. Accordingly, to realize an arrangement which can inform the operator using each individual radio telephone set of the service states of the wired lines without a special operation, it is important to consider how to transmit information indicative of the service states of the wired lines to all radio telephone sets.

SUMMARY OF THE INVENTION

The present invention has been made by noticing that in a radio communication apparatus employing a control channel, all radio telephone sets can receive a signal communicated over the control channel.

It is, therefore, an object of the present invention to provide a radio communication apparatus which transmits information indicative of service states of wired lines to all radio telephone sets by utilizing a communication with a base unit which is established by using the control channel of any radio telephone set, whereby an operator using each individual radio telephone set can be informed of the service states of the wired lines without performing a special operation.

To achieve the above object, in accordance with the present invention, there is provided a radio communication apparatus which comprises a base unit connected to a plurality of wired lines, a plurality of radio telephone sets connected to the base unit via a radio link, a wired-line information transmitting means disposed in the base unit for transmitting wired-line information indicative of the service states of the wired lines during a communication with any of the radio telephone sets which is established by using a control channel, and a display disposed in each of the radio telephone sets for receiving the wired-line information transmitted by using the control channel and displaying the service states of the wired lines on the basis of the wired-line information.

The wired-line information transmitting means transmits the wired-line information indicative of the service states of the wired lines with such wired-line information contained in a control signal which is transmitted from the base unit to the radio telephone sets, for example, when the base unit is to make a radio link with the radio telephone sets or at the time when the radio link is established.

The radio telephone set receives the wired-line information from the base unit, and displays the service states of the wired lines on a display on the basis of the wired-line information. Accordingly, the operator using the radio telephone set can be informed of the service states of the wired lines at the time of the origination of a call, whereby the operator can effectively select an available wired line.

DESCRIPTION OF THE PREFERRED EMBODIMENTS

Figure 1:
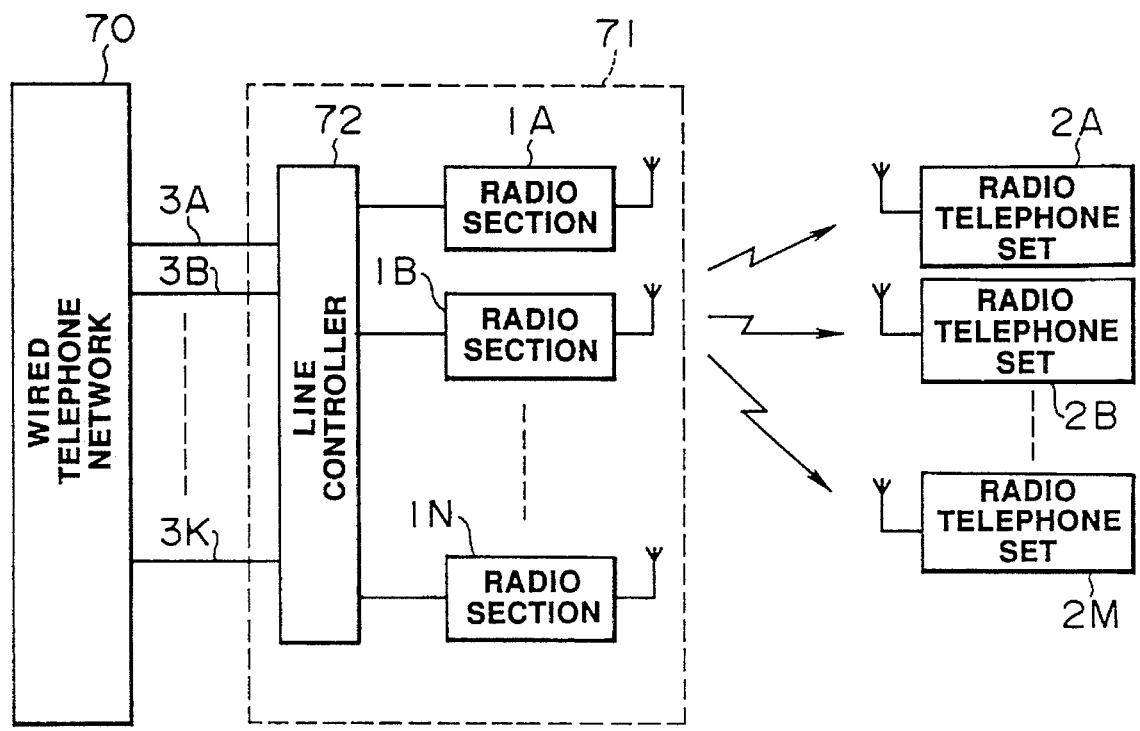
FIG. 1 is a block diagram showing one embodiment of the present invention.

FIG. 1 is a block diagram showing one embodiment of a radio communication apparatus according to the present invention. In the shown embodiment, a base unit 71 includes a line controller 72 connected to a wired telephone network 70 via wired lines 3A to 3K and a plurality of radio sections 1A to 1N. A plurality of radio telephone sets 2A to 2M are connected via a radio link to the plurality of radio sections 1A to 1N provided in the base unit 71.

Figure 2:
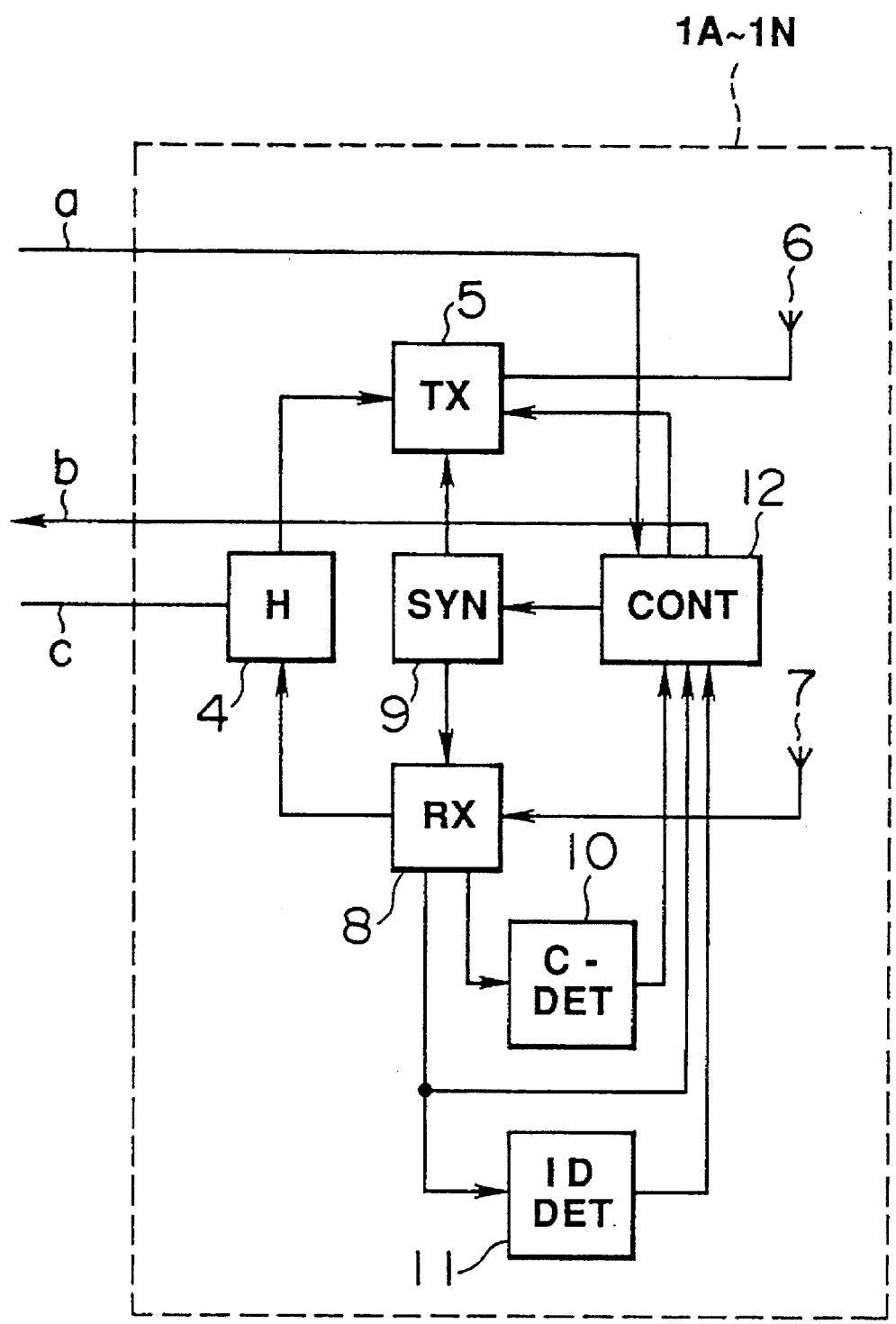
FIG. 2 is a block diagram showing details of each radio section in the embodiment shown in FIG. 1.

FIG. 2 is a block diagram showing in detail an example of the construction of each of the radio sections 1A to 1N. FIG. 2 representatively shows one of the radio sections 1A to 1N, and the shown radio section 1A, 1B, . . . or 1N is connected to the line controller 72 which will be described later in detail in connection with FIG. 4, via a voice line c, a control signal line b leading to the line controller 72 and a control signal line a leading from the line controller 72. The shown radio section 1A, 1B, . . . or 1N includes a hybrid circuit 4, a transmitter 5, a transmitting antenna 6, a receiving antenna 7, a receiver 8, a synthesizer 9, a received-electric field detecting circuit 10, an identification signal detecting circuit 11 and a control circuit 12. Details of the operation of each element are substantially identical to those of the operation of the corresponding element of the conventional example shown in FIG. 11. Accordingly, detailed description is omitted for the sake of simplicity.

Figure 3:
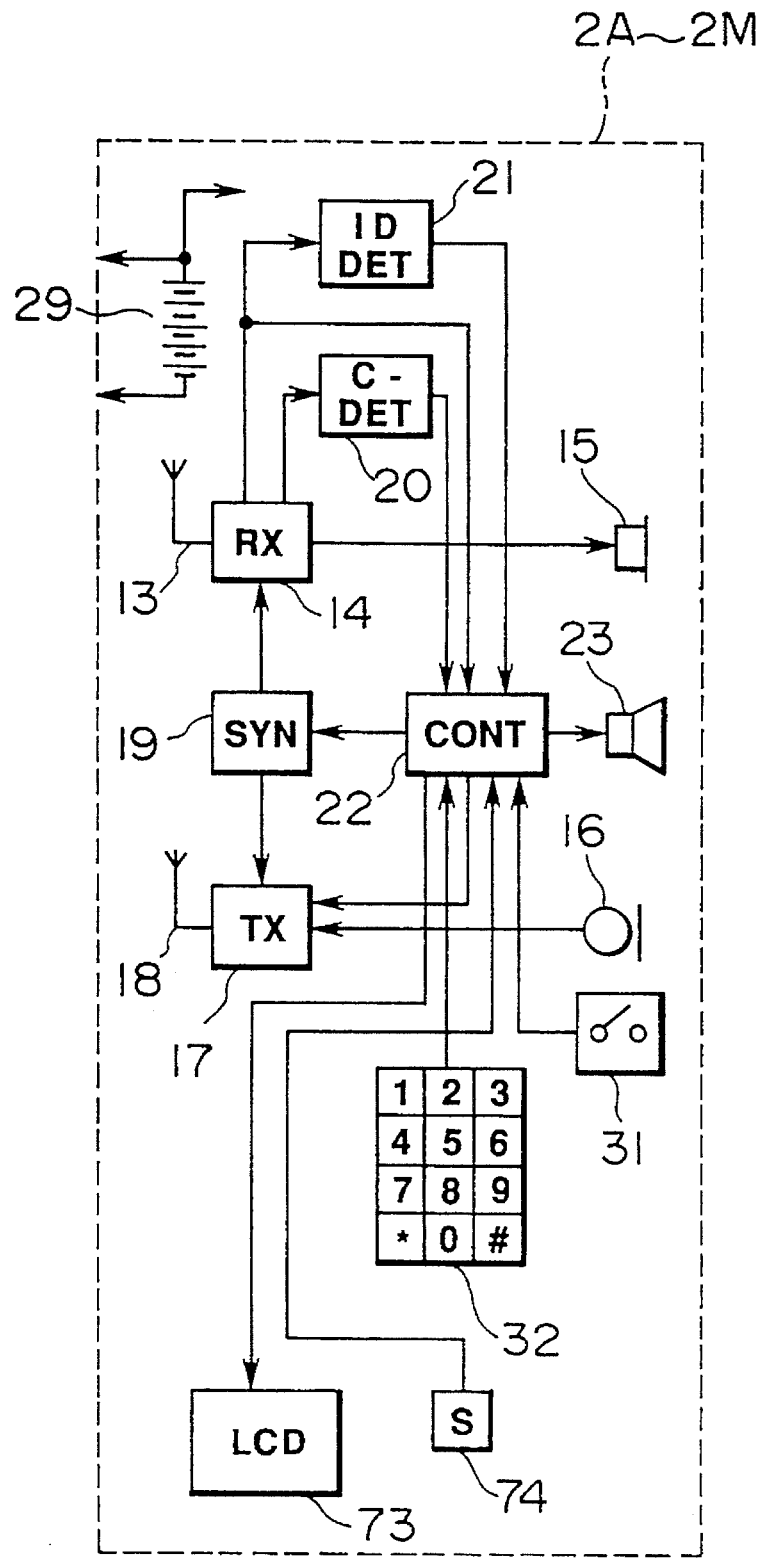
FIG. 3 is a block diagram showing details of a radio telephone set in the embodiment shown in FIG. 1.

FIG. 3 is a block diagram showing in detail one example of the construction of each of the radio telephone sets 2A to 2M. FIG. 3 representatively shows one of the radio telephone sets 2A to 2M. The shown radio telephone set 2A, 2B, . . . or 2M has a construction in which an LCD display 73 for displaying the service states of wired lines and a function button 74 for selecting a desired wired line are added to the construction of the conventional radio telephone set 2 shown in FIG. 11. The elements other than the LCD display 73 and the function button 74 are substantially identical to the elements of the conventional example which are denoted by the identical reference numerals in FIG. 11. Accordingly, detailed description is omitted for the sake of simplicity.

Figure 4:
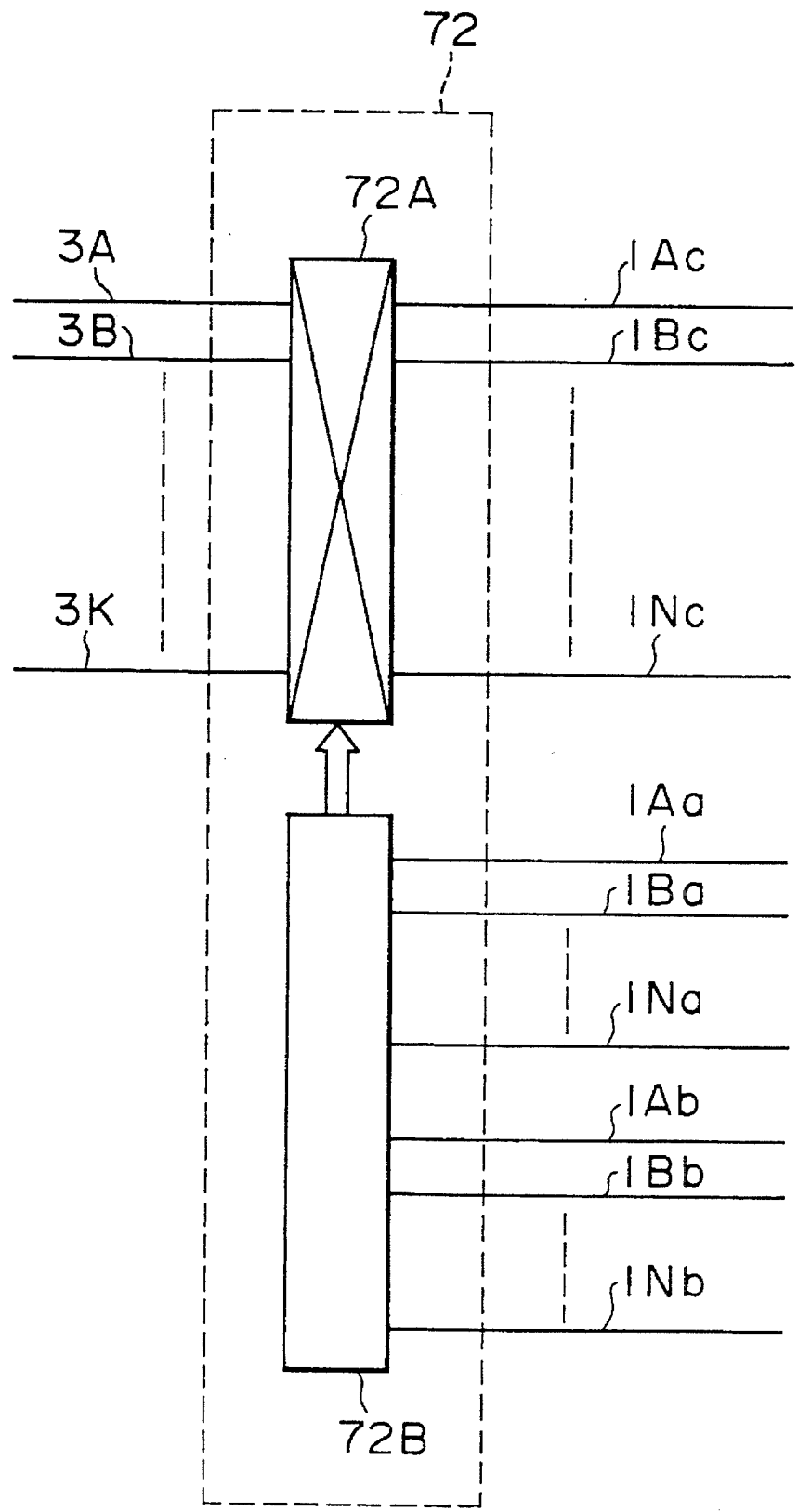
FIG. 4 is a block diagram showing details of a line controller in the embodiment shown in FIG. 1.

FIG. 4 is a block diagram showing in detail one example of the construction of the line controller 72. The line controller 72 includes a switch part 72A constituted by cross-point switches or the like and a control part 72B for controlling the switch part 72A and for transmitting and receiving control signals to and from the radio sections 1A to 1N. One end of the switch part 72A is connected to the wired telephone network 70 shown in FIG. 1 via the wired lines 3A to 3K, while the other end is connected to the radio sections 1A to 1N via voice lines 1A$c$ to 1N$c$ (which are representatively shown as the voice line c in FIG. 2). The control part 72B is connected to the radio sections 1A to 1N via control signal lines 1A$a$ to 1N$a$ (which are representatively shown as the control signal line a in FIG. 2) and control signal lines 1A$b$ to 1N$b$ (which are representatively shown as the control signal line b in FIG. 2).

Figure 11:
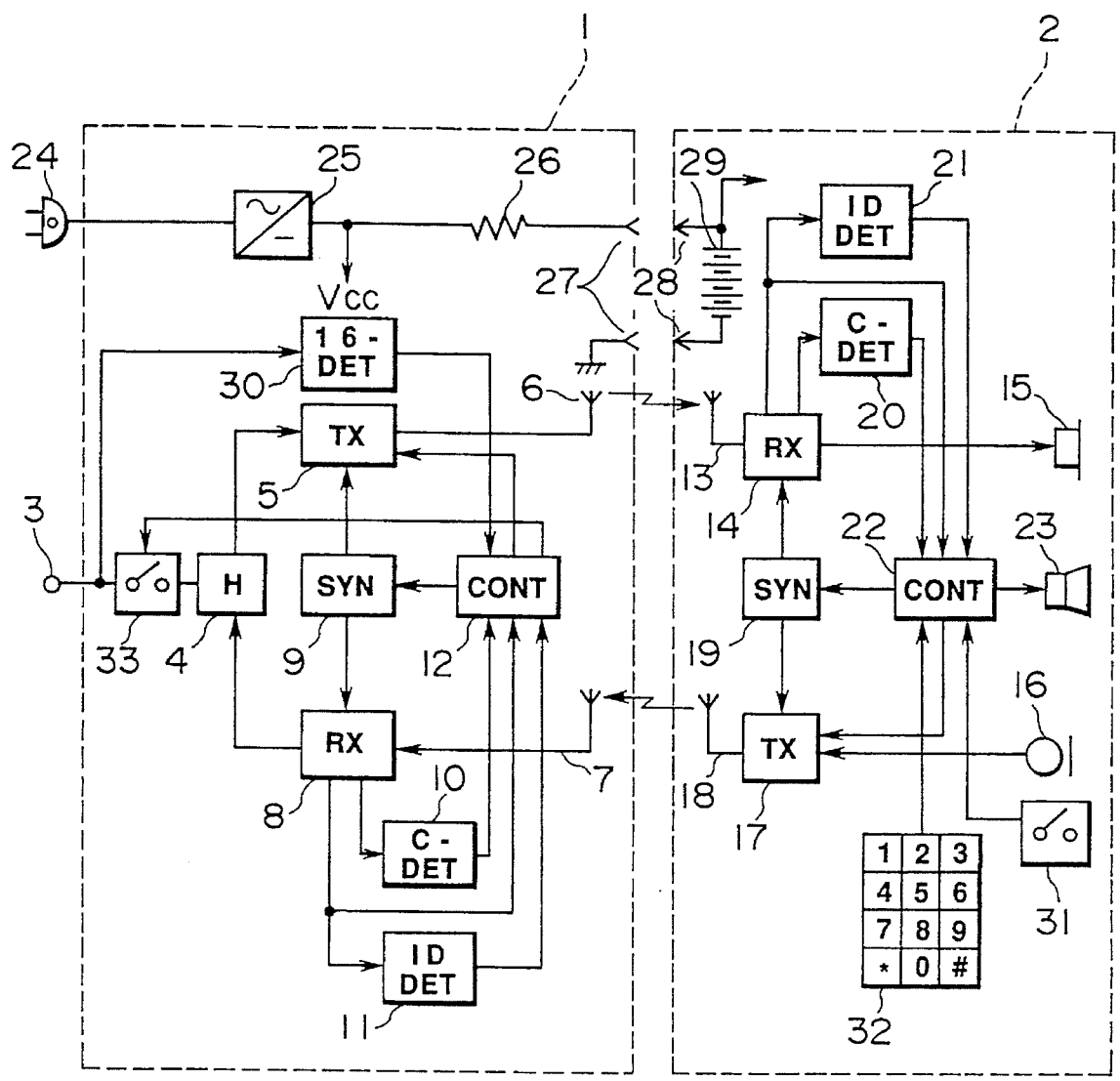
FIG. 11 is a block diagram showing a conventional example.
Figure 12:
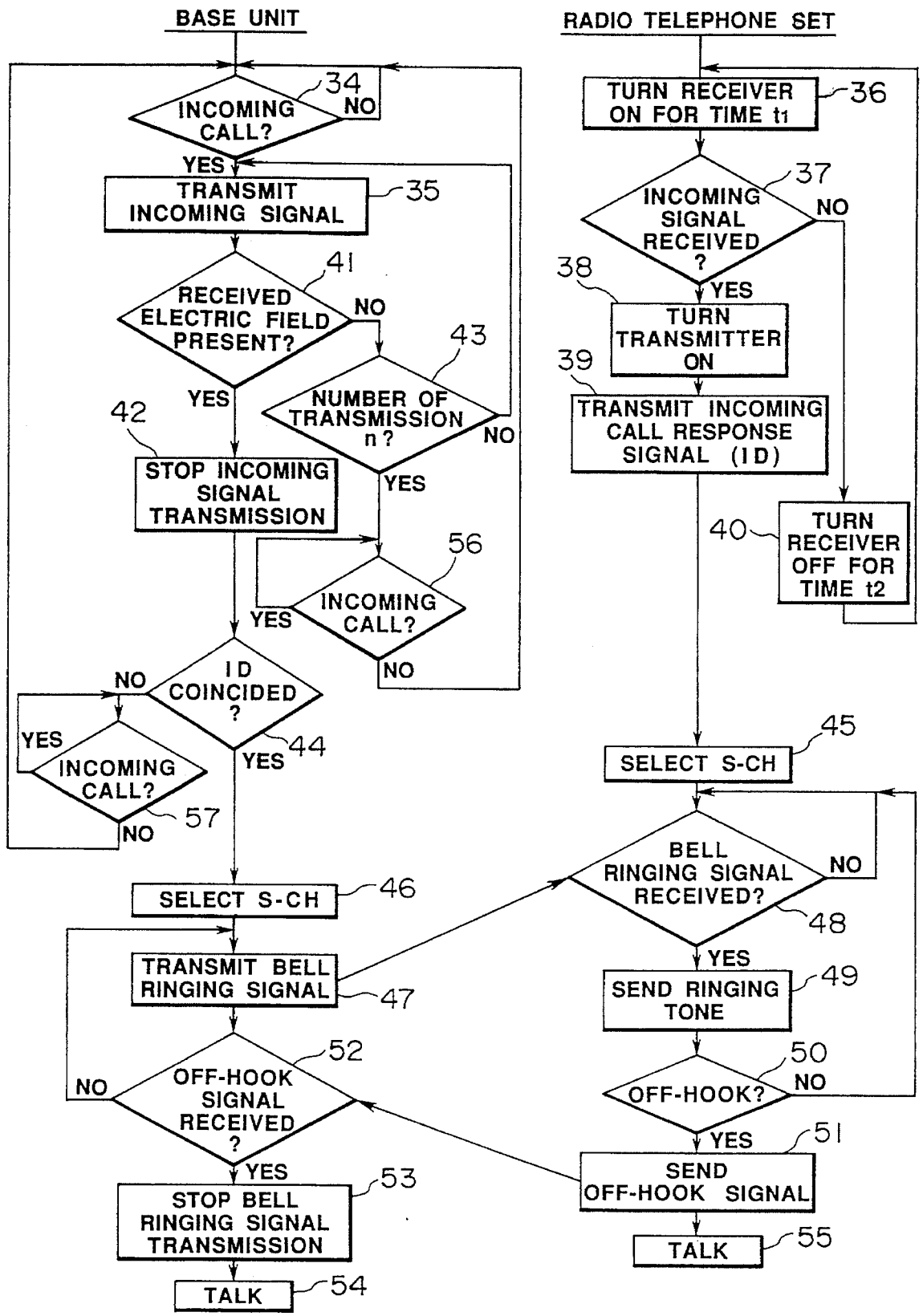
FIGS. 12 and 13 are operational flowcharts of the conventional example shown in FIG. 11.
Figure 13:
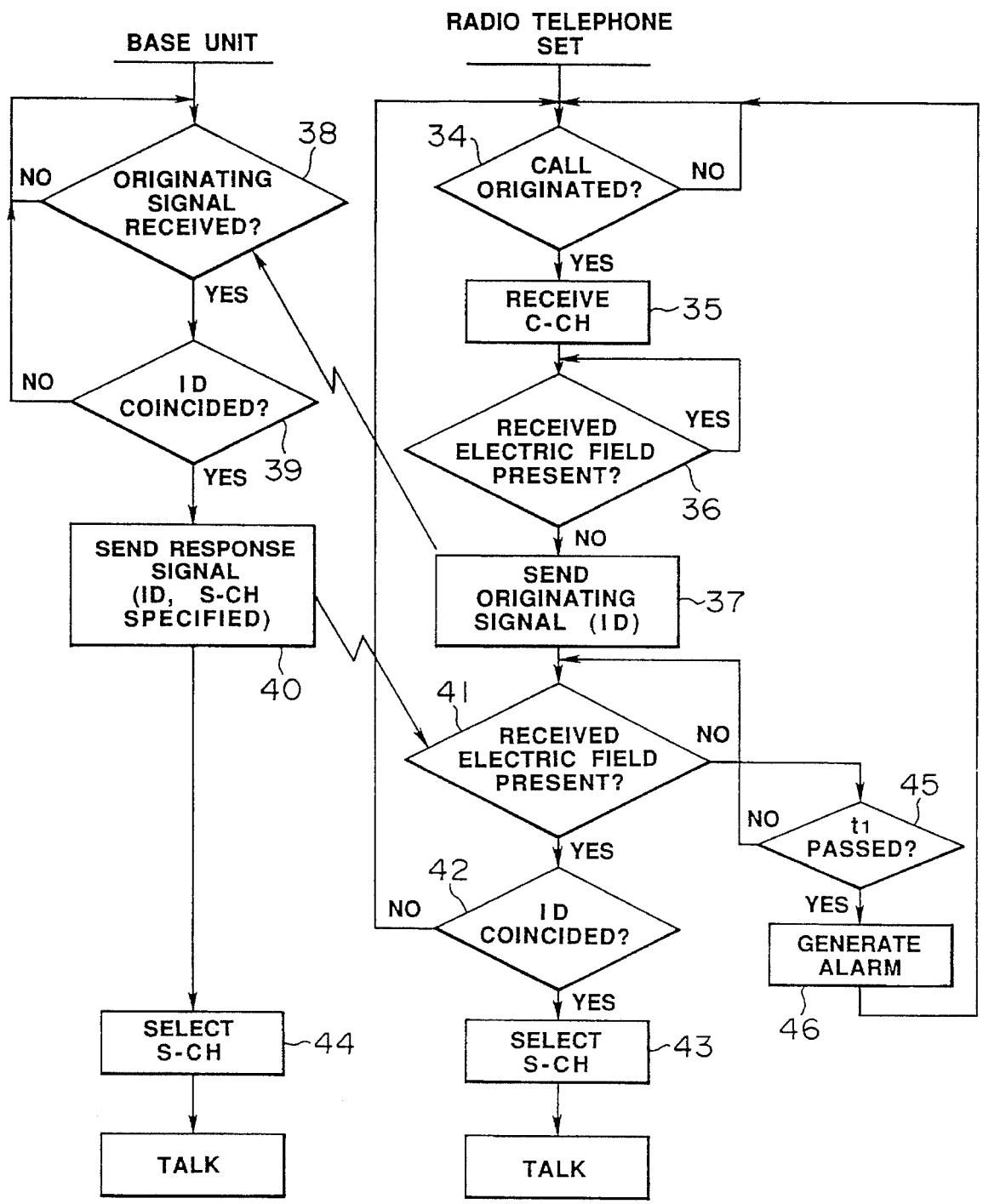

The power circuit of the base unit 71 is substantially identical to that of the conventional example explained in connection with FIG. 11, and a battery 29 of each of the radio telephone sets 2A to 2M is charged by a charger (not shown).

Figure 5:
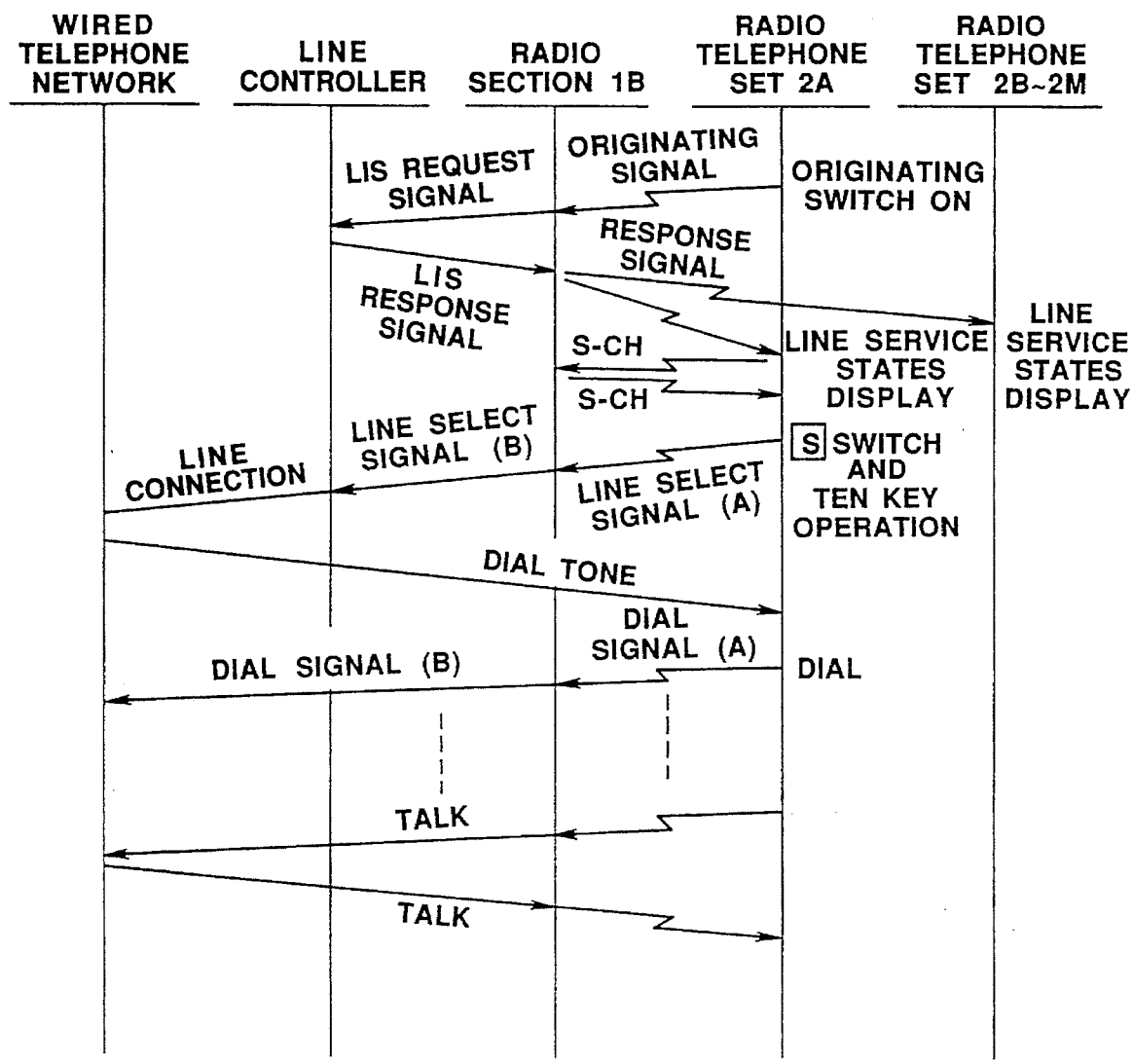
FIG. 5 is a sequence chart explaining the operation of the embodiment shown in FIG. 1.

FIG. 5 is a sequence chart showing the operation of the above-described embodiment.

As shown, when an originating switch 31 of one of the radio telephone sets 2A to 2M, for example, the radio telephone set 2A, is turned on, an originating signal and a response signal are communicated between the base unit 71 and one of the radio sections 1A to 1N, for example, the radio section 1B, whereby a radio link is established on a speech channel S-CH.

Figures 6, 7:
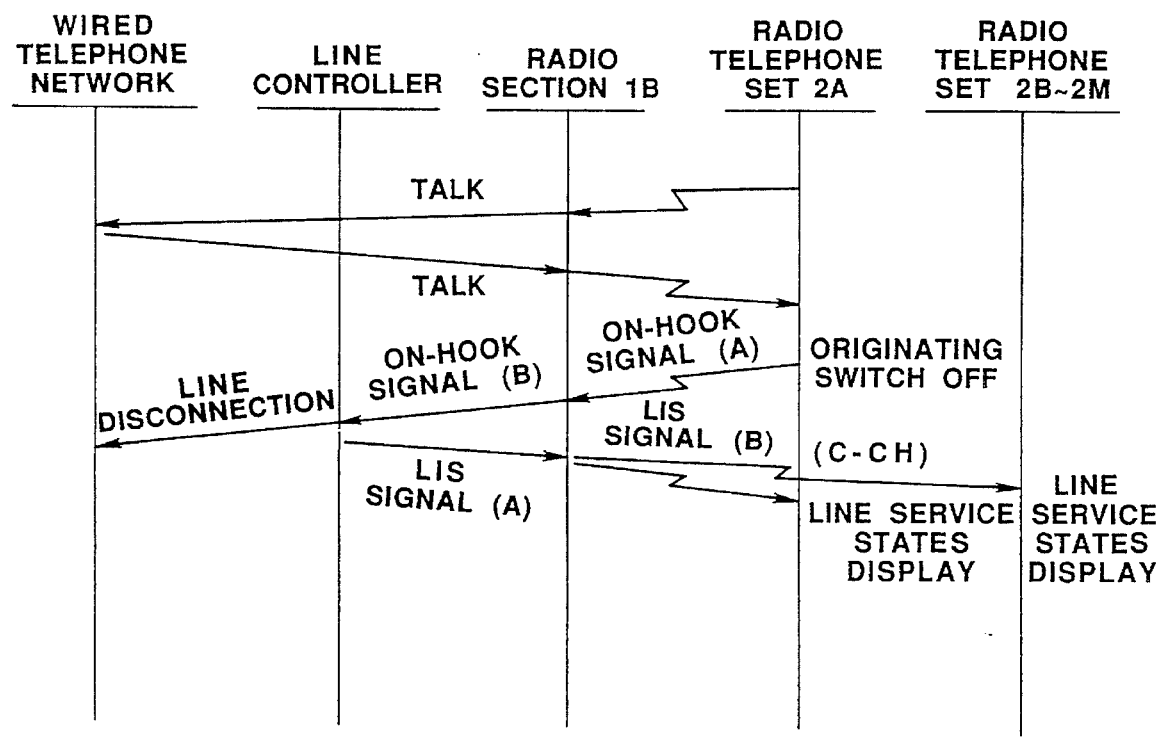
FIG. 6 is a format diagram showing the arrangement of signals used in the embodiment shown in FIG. 1.
FIG. 7 is a sequence chart explaining the operation of another embodiment of the present invention.

The above-described embodiment differs from the conventional example in that the response signal has a signal arrangement such as that shown in FIG. 6 and contains a signal (hereinafter referred to as an "LIS") indicative of the service states of wired lines in addition to a bit sync signal, a frame sync signal and an identification signal (ID code).

The LIS may contain, for example, K-bit information corresponding to the wired lines 3A to 3K, and is realized by a combination of "0" indicative of "idle" and "1" indicative of "busy".

The LIS may further contain two bits which are assigned to each of the wired lines, and the two bits may be arbitrarily combined so as to indicate various states of the corresponding wired line. For example, the two bits may be combined so that "00", "01", "10" and "11" indicate four different states: "idle", "busy", "holding" and "message received". As a matter of course, the entire LIS may also be constructed as an error correction code so as to enhance signal reliability.

To make the response signal to contain the LIS, an LIS request signal is transmitted from the radio section 1B to the line controller 72 over a control signal line 1Bb. When receiving the LIS request signal, the line controller 72 transmits an LIS response signal containing the service states of the wired lines 3A to 3K to the radio section 1B over a control line 1Ba.

It is to be noted that arbitrary variations can be made; for example, the LIS request signal may be omitted by adopting an arrangement in which each time the service states of the wired lines 3A to 3K change, signals are transmitted from the line controller 72 to the radio sections 1A to 1N so as to always supply the radio sections 1A to 1N with LIS information.

When the radio telephone set 2A receives the LIS, the service states of the wired lines 3A to 3K are displayed on the LCD display 73 in accordance with the contents of the LIS. The method of display is arbitrary and, for example, the number of an idle line from among the wired lines 3A to 3K may be displayed numerically.

An operator may look at the display and enter the number of the numerically displayed idle line (for example, "3") by operating a function button 74 and a ten-key pad 32.

The radio telephone set 2A sends out the entered number as a line select signal (A) (which indicates that a wired line (3) should be selected). When receiving the line select signal (A), the radio section 1B converts it into a line select signal (B) and transmits it to the line controller 72 over the control signal line 1Bb.

When the line controller 72 receives the line select signal (B), it selects the selected wired line (3C corresponding to the wired line (3)) and connects a voice line 1Bc corresponding to the radio section 1B to the wired telephone network 70.

In consequence, a dial tone is transmitted over the wired telephone network 70 and inputted to the radio section 1B via the wired line 3C, the line controller 72 and the voice line 1Bc. The dial tone is further transmitted to the radio telephone set 2A over a radio link, so that the dial tone is heard from earpiece 15 of the radio telephone set 2A.

When the operator dials by operating the dial pad 32 of the radio telephone set 2A, a dial signal (A) is transmitted from the radio telephone set 2A to the radio section 1B. The radio section 1B converts the dial signal (A) into a dial signal (B), which is sent out onto the wired telephone network 70 via the line controller 72 and the wired line 3C.

Dialing is completed by repeating the above-described dialing operation by the required number of times. If a called party answers, a telephone communication over the wired telephone network 70 is established.

During this time, any non-busy radio telephone sets from among the radio telephone sets 2B to 2M excluding the radio telephone set 2A can receive the aforesaid response signal on the channel C-CH during its ready state.

If such non-busy radio telephone sets receive the response signal, they can receive the LIS similarly to the radio telephone set 2A and change the display contents of their LCD displays 73 in accordance with the contents of the LIS.

Similarly, at the time of the reception of an incoming signal, by adding the LIS to the incoming signal, it is possible to permit all the radio telephone sets 2A to 2M to change the display contents of their LCD displays 73.

The method of transmitting the LIS may be modified without departing from the gist of the present invention. For example, a new signal for transmitting the LIS may be provided instead of the aforesaid response signal or the incoming signal.

The LIS may also be transmitted at the time of the termination of a call (when a radio link is to be disconnected). Another embodiment of the present invention which is arranged in this manner will be explained below with reference to the sequence chart of FIG. 7.

If the originating switch 31 of the radio telephone set 2A is turned off while the radio telephone set 2A is communicating via the radio section 1B on the speech channel S-CH, the radio telephone set 2A transmits an on-hook signal (A) to the radio section 1B and returns to the ready state. When the radio section 1B receives the on-hook signal (A) from the radio telephone set 2A, the radio section 1B converts the on-hook signal (A) into an on-hook signal (B) and transmits it to the line controller 72 over the control signal line 1Bb.

When receiving the on-hook signal (B), the line controller 72 disconnects its connection with an active wired line and transmits an LIS signal (A) to the radio section 1B over the control signal line 1Bb. When receiving the LIS signal (A), the radio section 1B converts the LIS signal (A) into an LIS signal (B) and transmits the LIS signal (B) on the control channel (C-CH). When the radio telephone set 2A and the radio telephone sets from among the radio telephone sets 2B to 2M which are placed in their ready states receive the LIS signal (B), they change the service states of the wired lines displayed on their LCD displays 73.

In the above-described case, since the control channels C-CH are employed at the time of the termination of a call, traffic on a commonly used control C-CH increases. To prevent such a traffic increase, it is more preferable to add the following control.

Figure 8:
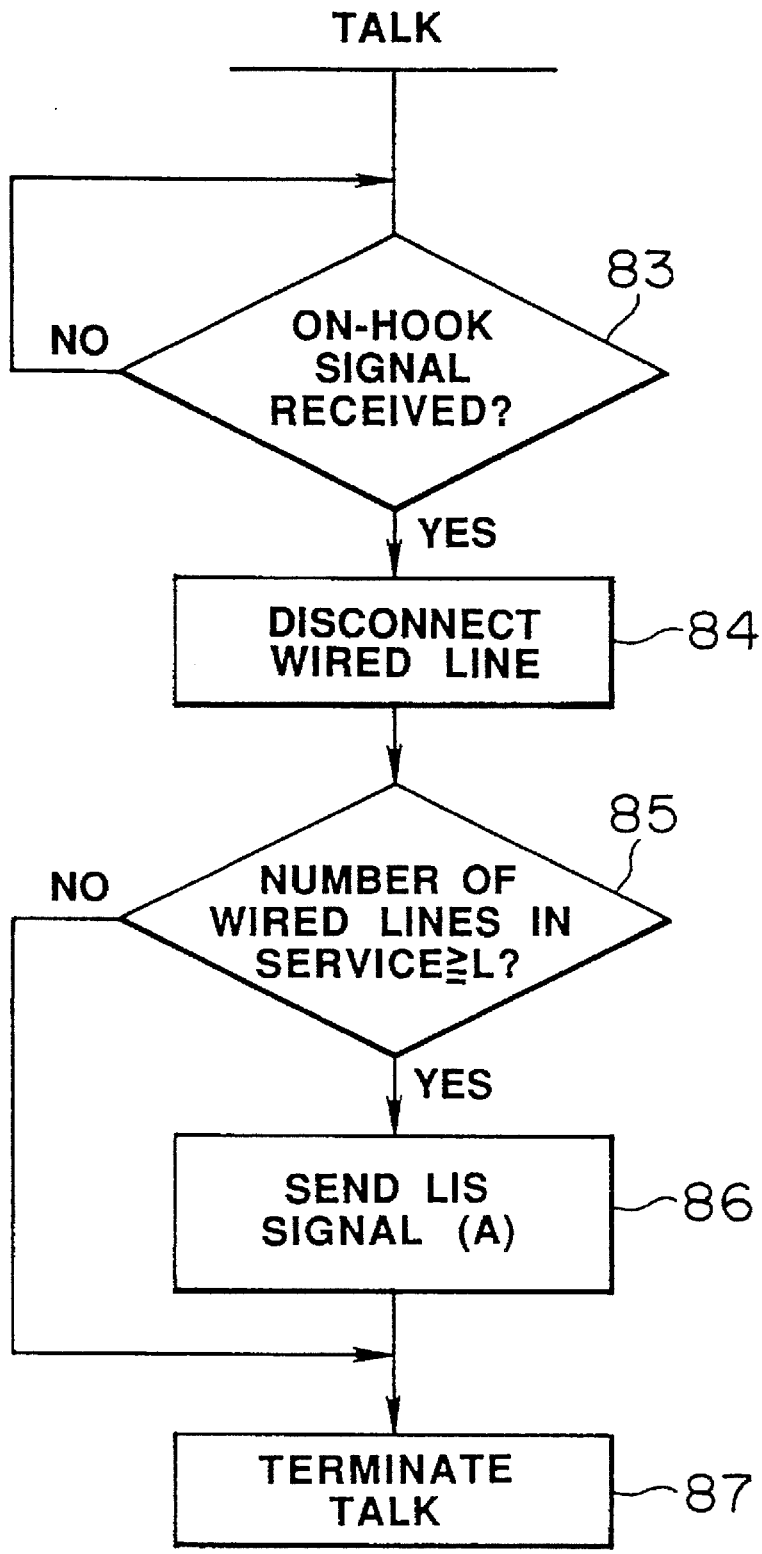
FIG. 8 is a flowchart which is used for explaining the operation of another embodiment of the present invention.

FIG. 8 is a flowchart showing a portion of the operation performed by the line controller 72 at the time of the termination of a call, which portion is associated with the present invention.

If the line controller 72 receives the on-hook signal (B) when, for example, the radio telephone set 2A is communicating via the radio section 1B (Step 83), the line controller 72 disconnects its connection with an active wired line (Step 84). At this time, if L or more wired lines from among the wired lines 3A to 3K are in service (Step 85), the LIS signal (A) is transmitted to the radio section 1B (Step 86). The radio section 1B converts the LIS signal (A) into the LIS signal (B) and transmits the LIS signal (B) on the control channel C-CH. When the radio telephone set 2A and the radio telephone sets from among the radio telephone sets 2B to 2M which are placed in their ready states receive the LIS signal (B), they change the service states of the wired lines displayed on their LCD displays 73.

However, if less than L wired lines from among the wired lines 3A to 3K are in service, the LIS signal (A) is not transmitted and the communication is terminated (Step 87). In this case, the display contents of the LCD displays 73 of the individual radio telephone sets are not changed.

In the case of, for example, L=4 for 8 wired lines (K=8), if half or more of the wired lines are in service, the LIS signal (A) is transmitted at the time of the termination of a communication and the display contents of the LCD displays 73 of the individual radio telephone sets are changed to display the service states of the wired lines. However, if not more than half of the wired lines are in service, this indicates that a sufficient number of idle wired lines are present. Accordingly, the display contents of the LCD displays 73 of the individual radio telephone sets are not changed by using radio waves on the control channels C-CH. In other words, if it is presumed that a large number of wired lines are in service and a large number of persons waiting for the wired lines to become idle, such display contents are changed even at the time of the termination of a communication.

Figure 9:
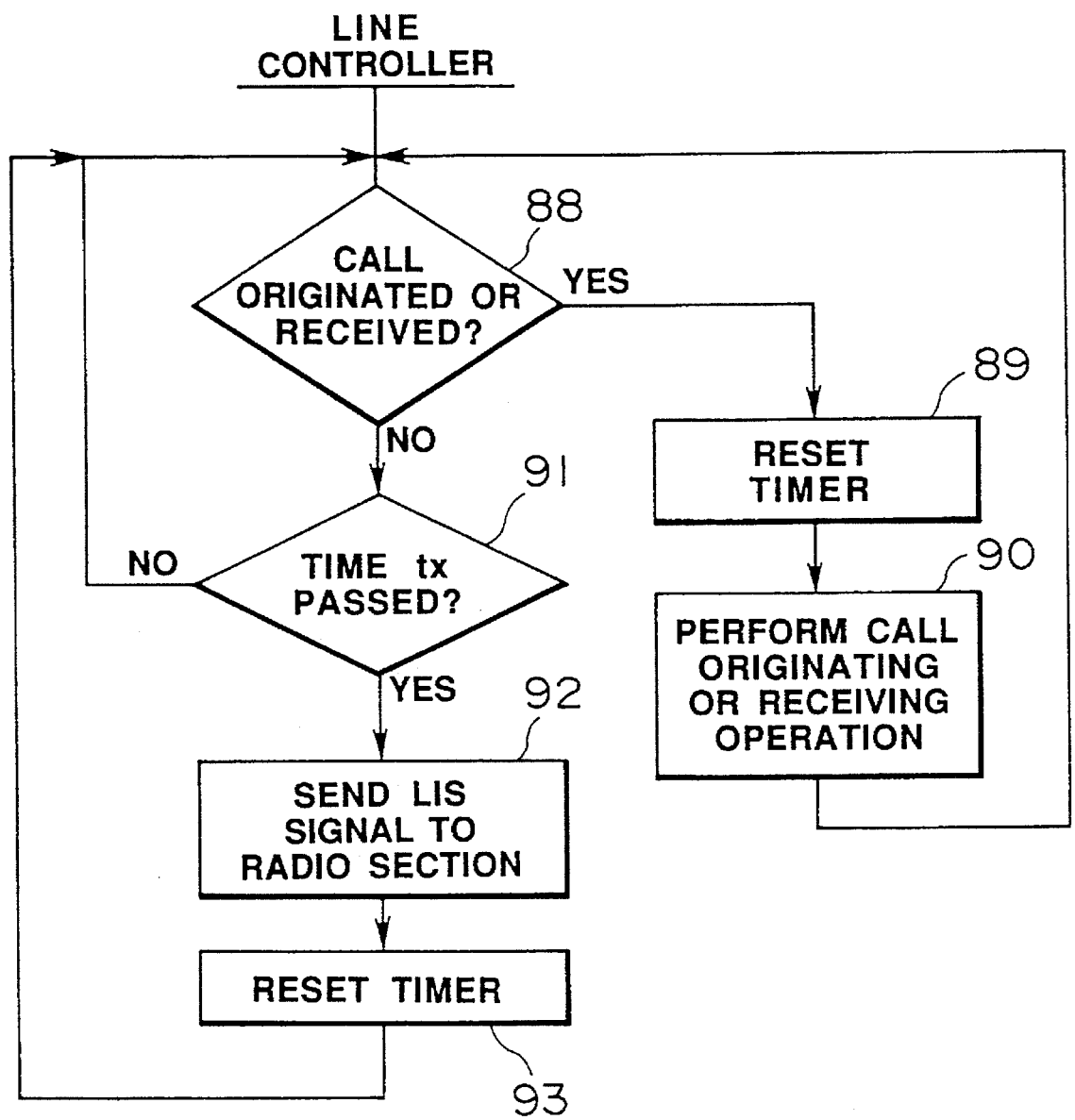
FIG. 9 is a flowchart explaining the operation of yet another embodiment of the present invention.

FIG. 9 is an operational flowchart showing the line controller 72 according to another embodiment of the present invention.

The control part 72B of the line controller 72 always monitors the occurrence of an outgoing call or an incoming call (if the LIS is transmitted only at the time of the origination of an outgoing call, the occurrence of the outgoing call may only be monitored). If any outgoing or incoming call occurs (Step 88), a timer (not shown) disposed in the control part 72B is reset (Step 89) and a call originating or receiving operation is carried out.

If neither an outgoing call nor an incoming call occurs and a time tx (for example, 30 minutes) passes (Step 91), the LIS signal (A) is transmitted to one radio section (one of the radio sections 1A to 1N) to cause the radio telephone sets 2A to 2M to change their displays of the service states of the wired lines, and the timer is reset (Step 93).

With the above-described arrangement, if there is a particular radio telephone set which has failed to receive a signal containing an LIS because it is temporarily placed at a location where the intensity of radio waves is low, such a radio telephone set can gain an opportunity to receive the signal after at least the time tx has passed. Accordingly, the state of the LCD display of the radio telephone set can be made closer to an actual service state.

To prevent unnecessary transmission of radio waves, the following contrivance is further needed.

First of all, an LIS is transmitted which contains information indicating that all the wired lines are idle; that is to say, in the case of the example shown in FIG. 9, when the last incoming or outgoing operation is performed in the night-time and the time tx passes, an LIS which indicates that all the wired lines are idle is transmitted.

However, since most business offices in the night time substantially remain in the above-described state until morning, the LIS need not be transmitted at the intervals of the time tx. For this reason, after the LIS indicating that all the wired lines are idle has been transmitted, it is preferable to transmit no LIS until the next incoming or outgoing operation occurs.

There may also be a case where the power source of the entire office is disconnected in the night-time. To cope with such a case, it is preferable to transmit LIS information when the power source of the base unit is turned on. In this case, since wired lines are of course in no use, it is also preferable to transmit information for simply resetting displays.

On the other hand, in accordance with the present invention, if a predetermined time passes while a radio telephone set is displaying any LIS information, the radio telephone set can receive new LIS information. By utilizing such a feature, if no LIS information is received even after the predetermined time has passed, it is preferable to determine that an abnormality has occurred (for example, the radio telephone set is placed in a location where the intensity of radio waves is extremely low), cancel the display contents of the radio telephone set, and make the LCD display 73 to provide a display to that effect.

In addition, the present invention is not limited to any of the above-described embodiments. For example, to change the display contents of the display of a particular radio telephone set, LIS information may be transmitted on the speech channel S-CH of the radio telephone set. Otherwise, the radio telephone set may be provided with exclusive receiving means for monitoring its control channel C-CH so that, even during a communication on the speech channel S-CH, the radio telephone set can receive LIS information transmitted on the control channel C-CH at the time of the incoming or outgoing operation of another radio telephone set.

Although each of the embodiments has been described in connection with a frequency division multi-channel access (FDM), the present invention can be similarly realized by using a time division multi-channel access (TDMA) system to accommodate LIS information into a time frame which transmits a control signal for a connecting operation.

Figure 10:
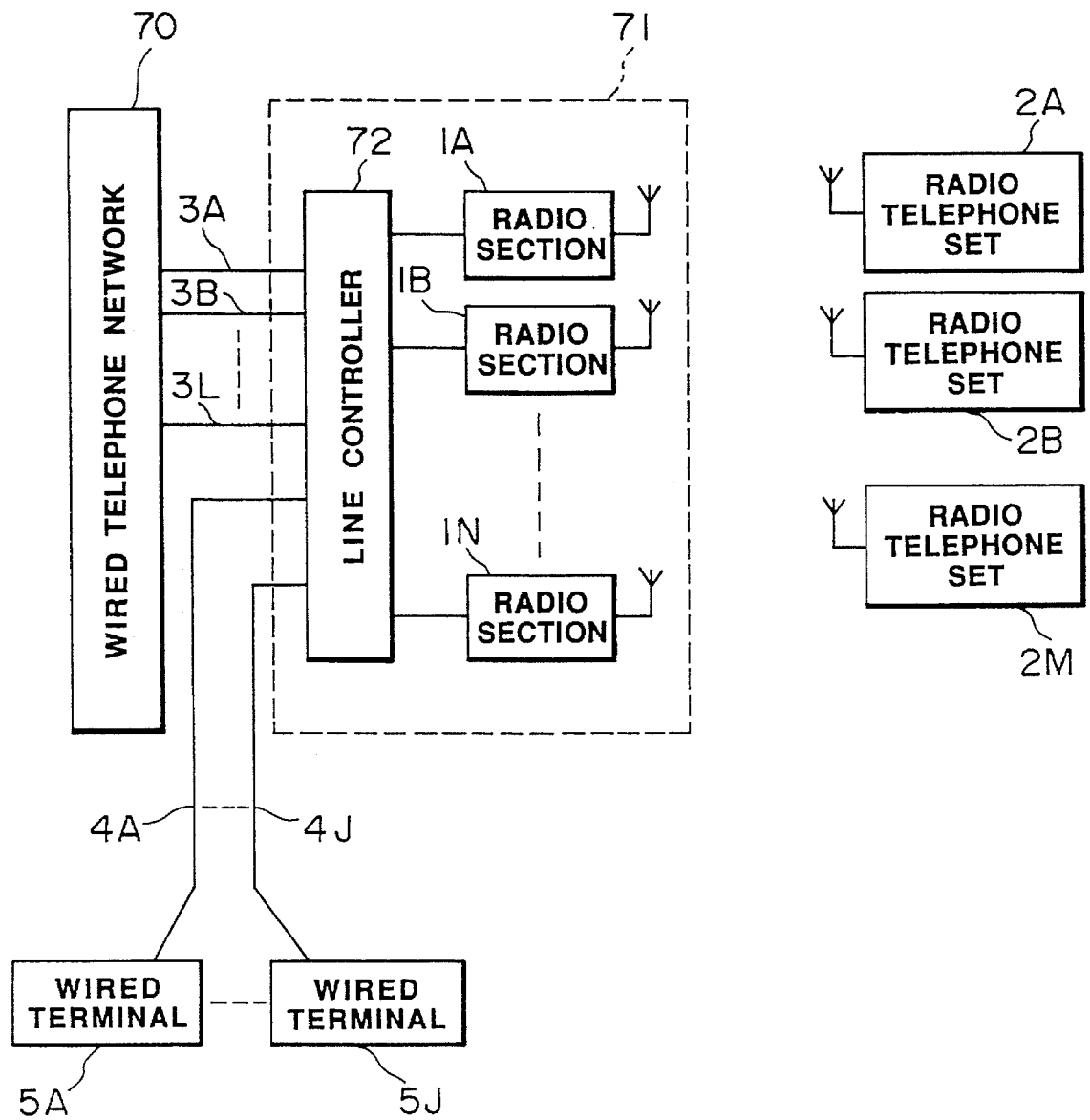
FIG. 10 is a block diagram showing another embodiment of the present invention.

Further, as shown in FIG. 10, the base unit 71 may be connected with wired terminals 5A to 5J through wired lines 4A to 4J, respectively. In this case, LIS information is transmitted over the wired lines 3A to 3L and 4A to 4L.

What is claimed is:

1. A radio communication apparatus comprising:

a base unit connected to a plurality of wired lines;

a plurality of radio telephone sets connected to said base unit via a radio link;

wired-line information transmitting means, disposed in said base unit, for transmitting wired-line information indicative of service states of the wired lines by using a control channel coupled to any radio telephone sets of said radio telephone sets during a communication using the control channel; and displaying means, disposed in said radio telephone sets, for receiving the wired-line information transmitted from said base unit by using the control channel, and for displaying the service states of the wired lines, wherein said wired-line information transmitting means transmits the wired-line information on condition that an outgoing signal from the radio telephone sets or an incoming signal from the wired lines does not appear for a predetermined time.

2. The radio communication apparatus according to claim 1, wherein the wired-line information transmitting means transmits the wired-line information by adding the wired-line information to a control signal transmitted through the control channel from the base unit to a particular one of the radio telephone sets, in response to which the particular one of the radio telephone sets establishes a speech channel between the base unit and the particular one of the radio telephone sets.

3. The radio communication apparatus according to claim 1, wherein the wired-line information transmitting means, when a speech channel established between the base unit and a particular one of the radio telephone sets is disconnected, transmits the wired-line information through the control channel.

4. The radio communication apparatus according to claim 1, wherein the wired-line information transmitting means transmits the wired-line information only when a number of the wired lines in a busy state is more than a predetermined number.

5. The radio communication apparatus according to claim 1, wherein, if the wired-line information is not received for more than a predetermined period of time, the displaying means cancels the display of the service states of the plurality of wired lines and provides a display indicating that wired-line information has not been received for more than the predetermined period of time.

6. A radio communication apparatus comprising:

a base unit having a plurality of radio sections and a line controlling section connected to said plurality of radio sections, said line controlling section being connected to a plurality of wired lines and being provided for connecting said plurality of wired lines with said plurality of radio sections;

a plurality of radio telephone sets connected to said plurality of radio sections of said base unit through a radio link including a control channel being receivable commonly by said plurality of radio telephone sets and a speech channel being switched from the control channel when a communication is to be made with a particular one of said plurality of radio telephone sets;

line information transmitting means for transmitting line information indicative of statuses of said plurality of wired lines connected to said line controlling section by adding the line information to a control signal transmitted through the control channel from any one of said plurality of radio sections of said base unit to any one of said plurality of radio telephone sets; and a plurality of displaying means, each provided in each of said plurality of radio telephone sets, for receiving the line information transmitted from said plurality of radio sections of said base unit by said line information transmitting means through the control channel, and for displaying the statuses of said plurality of wired lines on the basis of the received line information, wherein said line information transmitting means transmits the line information on condition that an outgoing call from said plurality of radio telephone sets or an incoming call from said plurality of wired lines does not occur for a predetermined time.

7. A radio communication apparatus comprising:

a base unit having a plurality of radio sections and a line controlling section connected to said plurality of radio sections, said line controlling section being connected to a plurality of wired lines and being provided for connecting said plurality of wired lines with said plurality of radio sections;

a plurality of radio telephone sets connected to said plurality of radio sections of said base unit through a radio link including a control channel being receivable commonly by said plurality of radio telephone sets and a speech channel being switched from the control channel when a communication is to be made with a particular one of said plurality of radio telephone sets;

line information transmitting means for transmitting line information indicative of statuses of said plurality of wired lines connected to said line controlling section by adding the line information to a control signal transmitted through the control channel from any one of said plurality of radio sections of said base unit to any one of said plurality of radio telephone sets; and a plurality of displaying means, each provided in each of said plurality of radio telephone sets, for receiving the line information transmitted from said plurality of radio sections of said base unit by said line information transmitting means through the control channel, and for displaying the statuses of said plurality of wired lines on the basis of the received line information, wherein said line information transmitting means inhibits transmission of the line information until any of said plurality of wired lines becomes busy after said line information transmitting means has transmitted information indicating that said plurality of wired lines are idle.

8. A radio communication apparatus comprising:

a base unit connected to a plurality of wired lines;

a plurality of radio telephone sets connected to the base unit through a radio link;

the radio link including at least one control channel for transmission of a control signal between the base unit and the radio telephone sets and being receivable commonly by the plurality of radio telephone sets, and a plurality of speech channels being switched from the control channel for transmission of a speech signal between the base unit and a particular one of the radio telephone sets;

display means provided in each of the plurality of radio telephone sets for displaying statuses of the plurality of wired lines;

wired-line information transmitting means, provided in the base unit, for transmitting through the control channel wired-line information indicative of the statuses of the plurality of wired lines, the wired-line information transmitting means transmitting the wired-line information through the control channel on a condition that an outgoing call from any of the plurality of radio telephone sets or an incoming call from any of the plurality of wired lines does not appear for a predetermined period of time; and display changing means, provided in each of the plurality of radio telephone sets, for receiving the wired-line information transmitted from the base unit by the wired-line information transmitting means through the control channel and changing the statuses of the plurality of wired lines displayed on the display means in accordance with the received wired-line information.

9. A radio communication apparatus comprising:

a base unit connected to a plurality of wired lines;

a plurality of radio telephone sets connected to the base unit through a radio link;

the radio link including at least one control channel for transmission of a control signal between the base unit and the radio telephone sets and being receivable commonly by the plurality of radio telephone sets, and a plurality of speech channels being switched from the control channel for transmission of a speech signal between the base unit and a particular one of the radio telephone sets;

display means provided in each of the plurality of radio telephone sets for displaying statuses of the plurality of wired lines;

wired-line information transmitting means, provided in the base unit, for transmitting through the control channel wired-line information indicative of the statuses of the plurality of wired lines, the wired-line information transmitting means inhibiting transmission of the wired-line information until any of the plurality of wired lines becomes busy after the wired-line information transmitting means has transmitted wired-line information indicating that all of the plurality of wired lines are idle; and display changing means, provided in each of the plurality of radio telephone sets, for receiving the wired-line information transmitted from the base unit by the wired-line information transmitting means through the control channel and changing the statuses of the plurality of wired lines displayed on the display means in accordance with the received wired-line information.

\* \* \* \* \*